United States Patent [19]

Preisler et al.

[11] Patent Number: 4,462,912
[45] Date of Patent: Jul. 31, 1984

[54] PROCESS FOR REMOVING MOLYBDENUM FROM AQUEOUS MANGANESE SALT SOLUTIONS

[75] Inventors: Eberhard Preisler, Erftstadt-Liblar; Bernhard Hofmann, Hürth-Knapsack; Gerhard Nolte, Erftstadt-Lechenich, all of Fed. Rep. of Germany

[73] Assignee: Hoechst Aktiengesellschaft, Fed. Rep. of Germany

[21] Appl. No.: 444,865

[22] Filed: Nov. 26, 1982

[30] Foreign Application Priority Data

Dec. 18, 1981 [DE] Fed. Rep. of Germany ....... 3150139

[51] Int. Cl.³ ............................................. B01D 15/00
[52] U.S. Cl. ................................... 210/665; 210/688; 210/722; 210/912
[58] Field of Search ............... 210/665, 688, 717, 722, 210/742, 743, 758, 777, 912

[56] References Cited

U.S. PATENT DOCUMENTS 2,542,743  2/1951  Weymouth et al. ............... 210/777
3,340,187  9/1967  Bell ..................................... 210/722
4,189,381  2/1980  Laferty et al. ...................... 210/688

Primary Examiner—Ivars C. Cintins
Attorney, Agent, or Firm—Connolly and Hutz

[57] ABSTRACT

The disclosure relates to a process for removing molybdenum from aqueous manganese(II)salt solutions by adsorbing the molybdenum on manganese dioxide and separating adsorbend and adsorbate from the purified manganese(II)salt solution. To this end, the disclosure provides for a pH value lower than 5 to be established in the manganese salt solution; for an oxidant capable of oxidizing manganese(II)compounds to manganese(IV)-compounds to be added at temperatures between 50° and 80° C., so as to effect oxidation of a small proportion of dissolved manganese(II)salt to manganese dioxide; for resulting precipitate to be allowed to remain in contact over a period of at least 15 minutes with the manganese(II)salt solution, and for the precipitate to be separated from said solution at said temperatures.

8 Claims, 4 Drawing Figures

Viscosity Of A 1.5 Molar Manganese Sulfate Solution And Residual Molybdenum Content Of The Solution After Adsorption And Filtration At Various Temperatures.
pH Of The Solution: 2
150 mg MnO₂/L; 60 mg Kieselguhr/L
Content Of The Solution Before Purification: 5 mg/L Molybdenum Viscosity Of A 1.5 Molar Manganese Sulfate Solution And Residual Molybdenum Content Of The Solution After Adsorption And Filtration At Various Temperatures.
pH Of The Solution: 2
150 mg $MnO_2$/L; 60 mg Kieselguhr/L
Content Of The Solution Before Purification: 5 mg/L Molybdenum Temperature- and pH-Dependence Of The Molybdenum Adsorption Onto Manganese Dioxide (75 mg/l). Molybdenum: 5 mg/l. Contact Time: 30 min. Temperature At Filtration.

Filtrate Output Of A Test Pressure Filter With A Pressure Of 6 Bar. Volume Of The Filtrate In Relation To 1m² Of Filter Surface. Filter Aid: Alumo-Silicate.

PROCESS FOR REMOVING MOLYBDENUM FROM AQUEOUS MANGANESE SALT SOLUTIONS

The present invention relates to a process for removing molybdenum from aqueous manganese(II)salt solutions by adsorbing the molybdenum on manganese dioxide and separating the adsorbent and adsorbate from the purified manganese(II)salt solution.

Manganese salt solutions which are made by dissolving naturally occurring ores are often contaminated with molybdenum which is liable to affect the work up of these solutions. This is more particularly true concerning solutions which are prepared for making manganese dioxide and which are therefore required to be purified prior to work up. Especially in the electrothermal production of manganese dioxide, a good deal of the molybdenum contained in the electrolyte solution goes forward into the final product.

In order for such manganese salt solutions to be freed from foreign metal ions, it is necessary for the impurities to be precipitated by neutralizing the solutions with the aid of manganese(II)oxide and alkali metal or alkaline earth metal hydroxides or carbonates (e.g. iron and aluminum and partially also nickel, cobalt, copper, arsenic and antimony). Next, the solutions are treated with hydrogen sulfide or a water-soluble sulfide, the residual heavy metals becoming precipitated in sulfide form (DE-PS No. 2 057 939).

As regards molybdenum, it is possible for it to be removed from the solutions partially only in the manner just described; in fact, electrochemical manganese dioxide made therefrom fails to comply with the purity specifications of to-day.

It has therefore been suggested (German Patent Application No. P 31 14 559.0) that the molybdenum contained as an impurity in aqueous manganese salt solutions should be adsorbed on granular electrolytically precipitated manganese dioxide. This process is however not satisfactory inasmuch as the small active surface of the adsorbent makes it necessary for it to be used in important quantities which must be regenerated for reasons of cost. The regeneration can be effected by scavenging treatment with an alkaline solution naturally with the use of expensive technical facilities and operational equipment.

Analytical tests made on sea water have also been described. More particularly, sea water specimens are brought into contact e.g. with manganese dioxide to effect the adsorption (concentration) of metal ions, inter alia molybdenum ions, on manganese dioxide. To this end, the water is admixed with a manganese sulfate solution and bromine water or potassium permanganate to effect the precipitation of most finely divided manganese dioxide, or it is admixed with a suspension of freshly precipitated manganese dioxide. After establishment of the adsorption equilibrium, precipitated manganese dioxide is filtered off.

The present invention now provides a process permitting molybdenum to be separated from a relatively concentrated manganese salt solution (about 0.5-2 molar) to the extent necessary for the purified solution to contain not more than 0.1 mg/l molybdenum. To this end, use can principally be made of the known adsorption on manganese dioxide as no agents foreign to the system become introduced into the solution.

Laboratory methods developed heretofore for analytical purposes provide for use to be made of solutions buffered to a pH of 3 to 4 and for the molybdenum to be adsorbed by means of manganese dioxide produced in the respective solution, or co-precipitated therewith over relatively long periods, e.g. several days, the manganese dioxide being precipitated while hot and filtered at room temperature. This is a method which is not of assistance in the industrial treatment of more concentrated salt solutions as it does not permit molybdenum to be separated, under commercially attractive conditions, from these solutions to the extent necessary for them to comply with purity requirements. The reasons reside in that it is not desirable for buffer substances to be added, in that the manganese dioxide is obtained in most finely divided form passing through, or clogging, any filter, and in that the sedimentation and filtration of the manganese dioxide is additionally rendered difficult by the rather high viscosity of the salt solutions. By heating the suspension to 90°-95° C. it is indeed possible slightly to improve its filterability however at the price of the adsorbability of manganese dioxide, which is greatly impaired.

Figure 1:
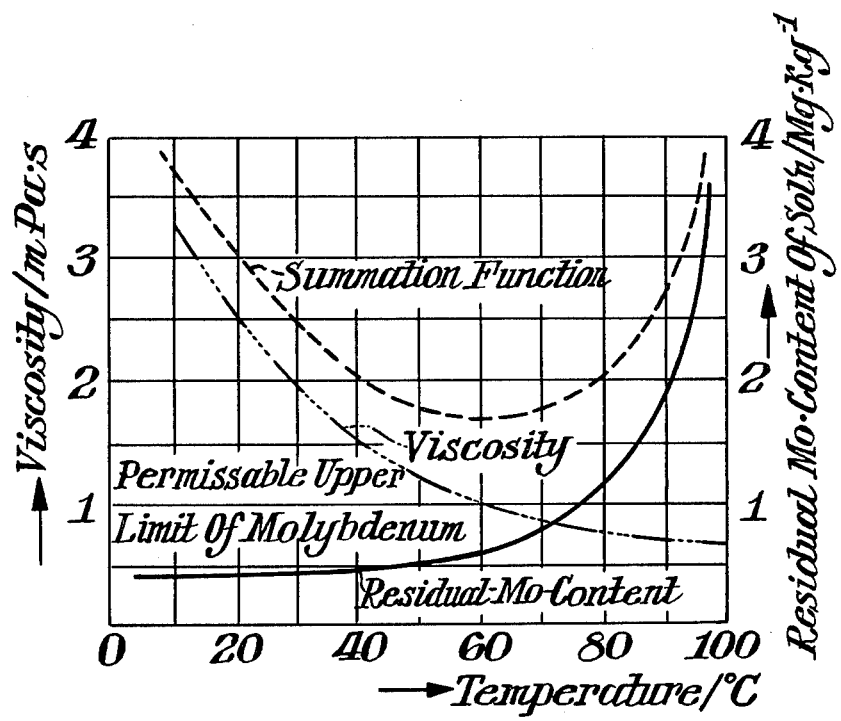
FIGS. 1-3 show various aspects of the invention.

We have now unexpectedly found that the specific adsorbability of manganese dioxide is not a linear function of temperature. In fact, starting from a temperature e.g. of 100° C., the adsorbability which is initially improved considerably at decreasing temperature, distinctly ceases to decrease further at still decreasing temperatures. This is shown in FIG. 1 of the accompanying drawing.

The viscosity of the solution which is critically co-determinative of filterability inversely commences increasing significantly at distinctly lower temperatures only; in other words, there is a mean temperature range within which purity and filterability are improved at an over-average rate as compared with the case of a linear temperature-responsiveness of these two parameters. This can clearly be seen from the minimum of the summation function shown in FIG. 1 of the accompanying drawing.

Figure 2:
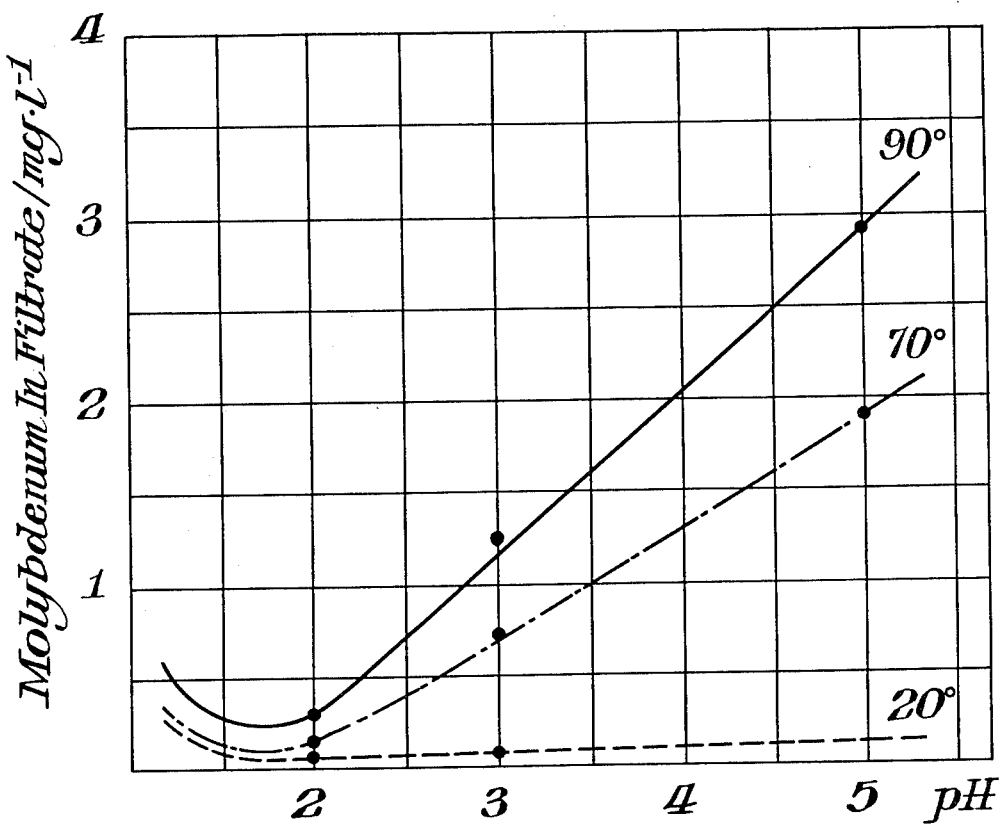

We have also found that a maximum of molybdenum is adsorbed at room temperature already at a pH-value of about 5; the adsorption at higher temperatures can be considerably improved by reducing the pH-value to less than 5. Even at 70° C. it is possible at a correspondingly low pH-value to come close to the adsorption values obtained at 20° C. (FIG. 2 of the accompanying drawing).

The present process for removing molybdenum comprises more particularly: establishing a pH-value lower than 2.6, preferably between 1.5 and 2.5 in the manganese salt solution; adding, at a temperature between 50° and 80° C., preferably 55° and 65° C., an oxidant capable of oxidizing manganese(II) compounds to manganese(IV) compounds and thereby effecting the oxidation of a small proportion of dissolved manganese(II) salt to manganese dioxide; allowing resulting precipitate to remain in contact over a period of at least 15 minutes, preferably 30 to 60 minutes, with the manganese(II)salt solution, and separating the precipitate from said solution at said temperature.

Figure 3:
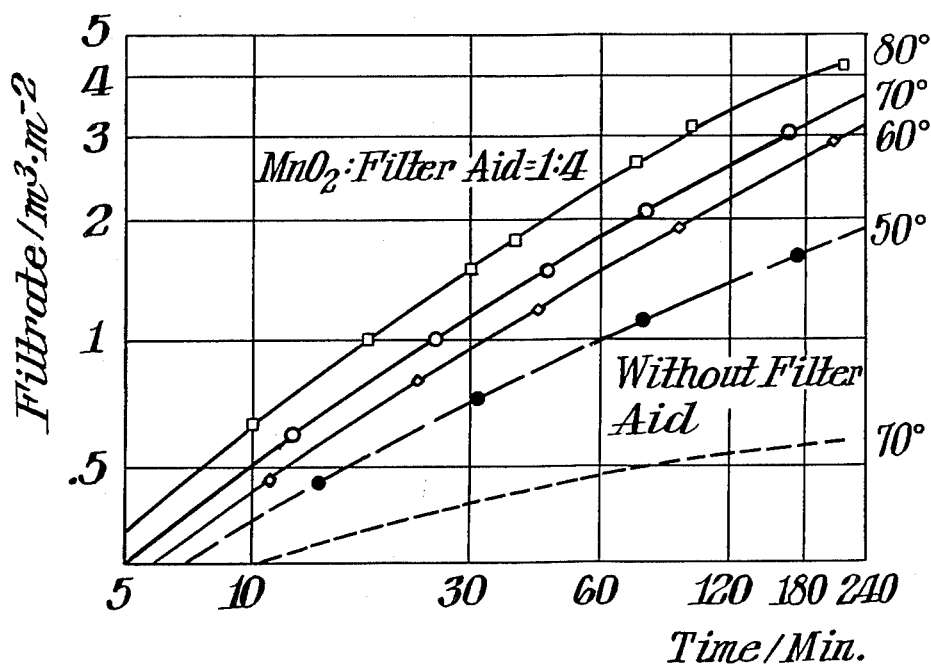

Sodium hypochlorite or potassium permanganate should preferably be used as the oxidant. In order to achieve commercially acceptable filtrate outputs under these conditions, it is just necessary in accordance with this invention for the manganese dioxide suspension to be admixed with a filter aid inert with respect to manganese salt solutions. Compared and bi-logarithmically represented in FIG. 3 of the accompanying drawings are the filtrate outputs obtained with and without filter aid addition, as well as the influence of temperature, determined on a test pressure filter. Filtration at room temperature, even if it were effected with the use of a filter aid, would entail considerably more expenditure.

Useful filter aids comprise more particularly ground volcanic silicates, which are known as perlite, but also diatomaceous earth (kieselguhr).

It is good practice to use the filter aid in a 3:1 to 8:1 weight ratio, based on manganese dioxide precipitate.

Figure 4:
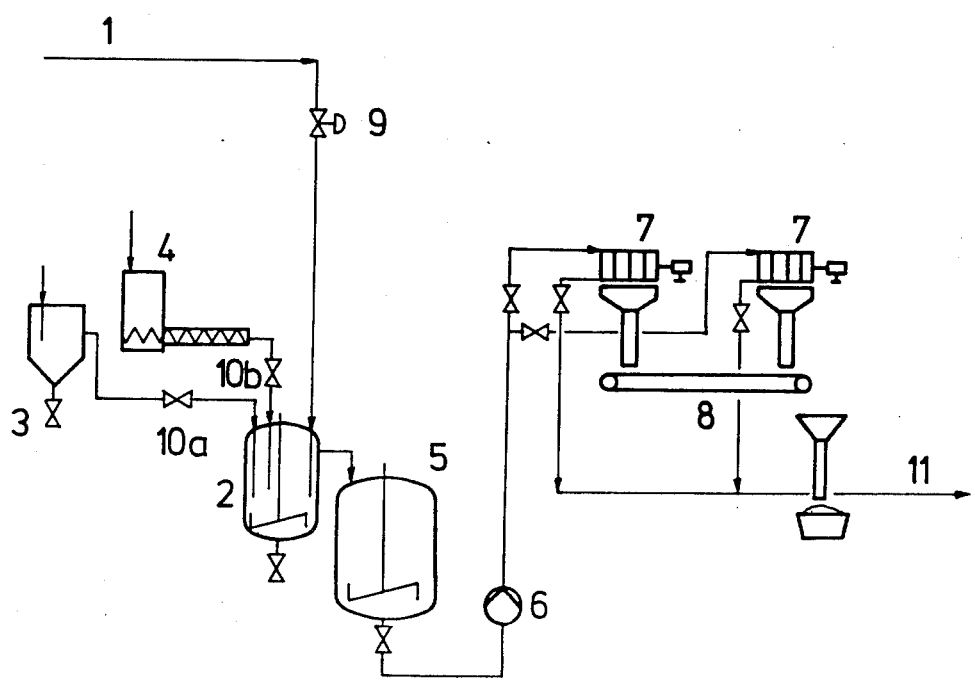
FIG. 4 shows apparatus useful in the invention.

By the continuous addition both of an oxidant, such as potassium permanganate or alkali metal hypochlorite, and filter aid, it is possible to provide for a regularly flowing stream of manganese salt solution and for it to be successively filtered, e.g. by means of a suction drum filter permitting the present process to be carried out continuously, or by means of two chamber filter presses permitting the process to be effected quasi continuously. This will now be described with reference to FIG. 4 of the accompanying drawings.

As can be seen, a manganese(II)salt solution adjusted to a pH-value e.g. of 2.5 is continuously introduced into an agitator-provided mixing vessel 2. The quantities of salt solution admitted are metered by means of volumeter 9. At the same time, a saturated potassium permanganate solution coming from reservoir 3 and filter aid coming from reservoir 4 are introduced into the mixing vessel, the quantities introduced being controlled by valves 10a and 10b, respectively, which in turn are regulated by volumeter 9.

By the introduction of steam, it is possible for the mixing vessel to be heated to, and maintained at, a temperature of 65° C., for example.

Through an apron-covered overflow, the suspension consisting of filter aid and hydrated manganese dioxide obtained from manganese(II)salt and potassium permanganate is introduced into sojourn vessel 5. This latter has dimensions necessary to ensure a minimum residence time of 30 minutes, under full load conditions. By means of pump 6, the suspension is given on to filter press 7, the effluent filtrate 11 being the solution purified. Filter cake which is collected on conveying belt 8 can be washed and, by means of suitable equipment, deposited or used otherwise. It is also possible for two filter presses to be alternately operated.

The invention also provides for the two filter presses to be replaced by a suction drum filter and for the mixing vessel 2 to be heated in a manner other than by direct steam heating. It is an important requirement however that the temperature of the solution should be high enough for the suspension in vessel 5 to have the temperature necessary for filtration. This depends on the heat insulation of vessel 5 and throughput rate.

The following Examples 1 and 2 are given for the purpose of comparison. They describe tests in which the conditions known from analytical work are applied to more highly concentrated manganese salt solutions on a semi-industrial scale. Examples 3 and 4 describe variants of the present process.

EXAMPLE 1

5 m³ manganese sulfate solution containing 60 g/l manganese and 5 mg/l molybdenum was treated so as to establish a pH-value of 3.8, heated to about 90°-95° C. and reacted with agitation with 200 mg/l potassium permanganate. About 280 mg/l manganese dioxide was obtained. The solution was cooled and the loose and flocculent manganese dioxide was filtered off using a chamber filter press with a filter area of 1 square meter, the pump being operated under a pressure of 6 bars. After a throughput of about 0.8 m³ a clear filtrate was obtained. After a further 10 hours, only 0.3 m³ clear filtrate was obtained, and filtration was discontinued. The solution contained 0.08 mg/l molybdenum.

EXAMPLE 2

The test of Example 1 was repeated but the suspension was maintained at a temperature of 90° C. Clear filtrate was obtained again after a throughput of about 0.8 m³. After 10 hours, 1.5 m³ clear solution which contained 0.9 mg/l molybdenum had been filtered off.

EXAMPLE 3

5 m³ manganese chloride solution containing 60 g/l manganese and 5 mg/l molybdenum was treated so as to establish a pH-value of 2.5 and admixed with 400 ml bleaching solution containing 80 g/l active chlorine. About 100 mg/l manganese dioxide was obtained. The suspension was heated to 60° C., allowed to stand for 30 minutes, admixed with 2.5 kg kieselguhr and filtered as described in Example 1. Clear filtrate was obtained after a throughput of less than 0.05 m³. The filtration of the 5 m³ solution was terminated after 5 hours. The filtrate was found to contain 0.1 mg/l molybdenum.

EXAMPLE 4

A manganese sulfate solution containing 60 g/l manganese and 5 mg/l molybdenum which had a pH-value of 2 was continuously introduced into an agitator-provided vessel, heated to 60° C. therein, and admixed (volume proportional to that of manganese sulfate solution) with a saturated potassium permanganate solution containing 100 mg $KMnO_4$ per liter manganese sulfate solution, and, by means of a feed screw conveyor, with aluminosilicate as a filter aid. A quantity of suspension formed in the agitator-provided vessel, proportional to the quantity of manganese sulfate feed solution, travelled through an apron-covered overflow from the lower portion of the vessel into a sojourn vessel and was successively filtered off by means of two alternately operated filter presses. The mean residence time of the solution in the sojourn vessel was about 45 minutes. The chamber volume of the filter presses was fully utilized. The average filtration velocity was 0.85 m³/m². h. The molybdenum content of the filtrate varied between 0.05 and 0.08 mg/liter.

We claim:

1. Process for removing molybdenum from aqueous manganese(II)salt solutions by adsorbing the molybdenum on manganese dioxide and separating adsorbent and adsorbate from the purified manganese(II)salt solution, which comprises: establishing a pH value lower than 5 in the manganese salt solution; adding, at temperatures between 50° and 80° C., an oxidant capable of oxidizing manganese(II)compounds to manganese(IV)-compounds and thereby effecting the oxidation of a minor proportion of dissolved manganese(II)salt to manganese dioxide; allowing resulting precipitate to remain in contact over a period of at least 15 minutes with the manganese(II)salt solution, and separating the precipitate from said solution at said temperatures.

2. Process as claimed in claim 1, wherein the oxidant is potassium permanganate or sodium hypochlorite.

3. Process as claimed in claim 1, wherein a pH-value between 1.5 and 2.5 is established.

4. Process as claimed in claim 1, wherein a temperature between 55° and 65° C. is maintained during the contact period of the salt solution with the precipitate and separation of the latter therefrom.

5. Process as claimed in claim 1, wherein the manganese dioxide precipitate is admixed with an inert filler aid and is then filtered off from the manganese salt solution.

6. Process as claimed in claim 5, wherein the filter aid and manganese dioxide precipitate are used in a ratio by weight of 3:1 to 8:1.

7. Process as claimed in claim 1, wherein the oxidant is used in a quantity sufficient for the production of 50 to 300 mg manganese dioxide per liter.

8. Process as claimed in claim 1, wherein 0.5 to 2 molar manganese(II)solutions are used as feed material.

* * * * *